(12) United States Patent
Alsina et al.

(10) Patent No.: US 10,313,761 B2
(45) Date of Patent: *Jun. 4, 2019

(54) MEDIA PLAYBACK ACROSS MULTIPLE DEVICES

(71) Applicant: Apple Inc., Cupertino, CA (US)

(72) Inventors: Thomas Alsina, Mountain View, CA (US); Charles J. Pisula, Bethesda, MD (US); Garrick McFarlane, London (GB)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/870,374

(22) Filed: Sep. 30, 2015

(65) Prior Publication Data

US 2016/0127799 A1 May 5, 2016

Related U.S. Application Data

(63) Continuation of application No. 13/828,972, filed on Mar. 14, 2013, now Pat. No. 9,179,199.

(51) Int. Cl.
| | |
|---|---|
| *H04N 21/6587* | (2011.01) |
| *H04N 21/41* | (2011.01) |
| *H04N 21/472* | (2011.01) |
| *H04N 21/433* | (2011.01) |
| *H04N 21/475* | (2011.01) |
| *H04N 21/8352* | (2011.01) |
| *H04N 21/845* | (2011.01) |

(52) U.S. Cl.
CPC ..... *H04N 21/6587* (2013.01); *H04N 21/4122* (2013.01); *H04N 21/4333* (2013.01); *H04N 21/4751* (2013.01); *H04N 21/47217* (2013.01); *H04N 21/8352* (2013.01); *H04N 21/8455* (2013.01)

(58) Field of Classification Search
None
See application file for complete search history.

(56) References Cited

U.S. PATENT DOCUMENTS

| | | |
|---|---|---|
| 5,926,624 A | 7/1999 | Katz et al. |
| 6,965,770 B2 | 11/2005 | Walsh et al. |
| 7,103,906 B1 | 9/2006 | Katz |
| 7,665,115 B2 | 2/2010 | Gallo et al. |
| 7,890,599 B2 | 2/2011 | Kalmanje et al. |

(Continued)

OTHER PUBLICATIONS

"Networked Digital Media Standards A UPnP/DLNA Overview", Allegro Software Development Corporation, 1740 Massachusetts Avenue, Boxborough, MA, 01719, www.allegrosoft.com, XP007906876, Oct. 26, 2006, 25 pages.

(Continued)

*Primary Examiner* — Jason K Lin
(74) *Attorney, Agent, or Firm* — Blank Rome LLP

(57) ABSTRACT

Pausing and resuming playback of a media item across a group of devices that belong to a user. A server maintains a media queue that includes playback records that contain a unique media item identifier and a bookmark position. When a pause instruction is received on a client device, the pause instruction is transmitted to the server as a playback record. The server in turn transmits the received playback record to other client devices within a group of client devices that belong to the user account of the client device.

24 Claims, 10 Drawing Sheets

(56) References Cited

U.S. PATENT DOCUMENTS

| | | | |
|---|---|---|---|
| 7,925,244 B2 | 4/2011 | Minor | |
| 8,341,557 B2 | 12/2012 | Pisula et al. | |
| 8,614,625 B2 | 12/2013 | Alsina et al. | |
| 8,855,469 B2* | 10/2014 | Maharajh | G06Q 10/10 386/248 |
| 9,430,115 B1* | 8/2016 | Yun | G06F 17/30843 |
| 9,961,374 B2* | 5/2018 | Kalmanje | H04L 65/1083 |
| 2002/0059610 A1* | 5/2002 | Ellis | H04N 5/44543 725/58 |
| 2002/0059621 A1 | 5/2002 | Thomas | |
| 2003/0126599 A1 | 7/2003 | Novak | |
| 2003/0236895 A1 | 12/2003 | Ohkubo | |
| 2004/0019658 A1 | 1/2004 | Plastina | |
| 2004/0117310 A1 | 6/2004 | Mendez et al. | |
| 2005/0039133 A1 | 2/2005 | Wells et al. | |
| 2005/0071762 A1 | 3/2005 | Kim et al. | |
| 2005/0097618 A1 | 5/2005 | Arling | |
| 2005/0286546 A1 | 12/2005 | Bassoli et al. | |
| 2006/0002681 A1 | 1/2006 | Spilo et al. | |
| 2006/0161635 A1 | 7/2006 | Lamkin et al. | |
| 2006/0161742 A1 | 7/2006 | Sugimoto et al. | |
| 2007/0055743 A1 | 3/2007 | Pirtle et al. | |
| 2007/0083556 A1 | 4/2007 | Plastina | |
| 2007/0136488 A1 | 6/2007 | Cho et al. | |
| 2007/0198111 A1* | 8/2007 | Oetzel | G06F 3/04855 700/94 |
| 2007/0198633 A1 | 8/2007 | Thibeault | |
| 2008/0005195 A1* | 1/2008 | Li | G06F 17/30174 |
| 2008/0028023 A1 | 1/2008 | Locke | |
| 2008/0091606 A1 | 4/2008 | Grecia | |
| 2008/0183843 A1 | 7/2008 | Gavin et al. | |
| 2008/0235229 A1 | 9/2008 | Kurien | |
| 2009/0106793 A1 | 4/2009 | Tecot et al. | |
| 2009/0158369 A1* | 6/2009 | Van Vleck | H04N 21/8456 725/110 |
| 2009/0193101 A1* | 7/2009 | Munetsugu | G11B 27/034 709/219 |
| 2009/0249222 A1 | 10/2009 | Schmidt et al. | |
| 2009/0259711 A1 | 10/2009 | Drieu et al. | |
| 2009/0282443 A1 | 11/2009 | Kim | |
| 2009/0297118 A1* | 12/2009 | Fink | H04N 7/17318 386/278 |
| 2010/0053302 A1 | 3/2010 | Ivashin | |
| 2010/0293598 A1 | 11/2010 | Collart et al. | |
| 2011/0047574 A1 | 2/2011 | Tecot et al. | |
| 2011/0138417 A1* | 6/2011 | Klappert | H04N 21/431 725/40 |
| 2012/0050012 A1 | 3/2012 | Alsina et al. | |
| 2012/0066387 A1 | 3/2012 | Park | |
| 2012/0078954 A1* | 3/2012 | Araya | G06F 17/30979 707/769 |
| 2012/0084455 A1 | 4/2012 | McCue | |
| 2012/0084803 A1 | 4/2012 | Johansson et al. | |
| 2012/0087634 A1 | 4/2012 | Lalwaney | |
| 2012/0130952 A1 | 5/2012 | Kwon | |
| 2012/0210343 A1* | 8/2012 | McCoy | H04N 21/25875 725/25 |
| 2012/0210371 A1 | 8/2012 | McCoy et al. | |
| 2012/0227076 A1 | 9/2012 | McCoy | |
| 2012/0311103 A1* | 12/2012 | Kunigita | H04N 5/76 709/219 |
| 2012/0324489 A1* | 12/2012 | Greenfield | H04N 21/4335 725/9 |
| 2013/0006947 A1 | 1/2013 | Akinyemi | |
| 2013/0339998 A1* | 12/2013 | Arme | H04N 21/4668 725/32 |
| 2014/0149555 A1* | 5/2014 | Bank | H04L 65/602 709/219 |

OTHER PUBLICATIONS

"UPnP AV Architecture: 1", XP-002662644, for UPnP Version 1.0, Status: Standardized DCP, Document Version 1.1, Copyright 2008 Contributing Members of the UPnP Forum, http://upnp.org/specs/av/UPnP-av-AVArchitecture-v1-20080930, Sep. 30, 2008, 30 pages.

Alsina, Thomas M. et al., "Adaptive Media Content Scrubbing on a Remote Device", International Search Report and Written Opinion, Application No. PCT/US2011/049390, Filed Aug. 26, 2011, Nov. 17, 2011, 9 pages.

Alsina, Thomas M. et al., "Adaptive Media Content Scrubbing on a Remote Device", Notice of the International Preliminary Report on Patentability, Application No. PCT/US2011/049390, Aug. 26, 2011, Mar. 14, 2013, 7 pages.

Lim, Byungsoo et al., "UPnP AV Transport Service using the Add-in-System", Digital Media & Communication R& D Center, Samsung Electronics Co., Ltd., Suwon, Korea, 2009 Third International Conference on Next Generation Mobile Applications, Services and Technologies, XP031569304, ISBN 978-0-7695-3786-3, Sep. 15, 2009, 6 pages.

"Amazon.com Help," Amazon.com/gp/help/customer/display.html, downloaded Aug. 2, 2012, 3 pgs.

"Global Media Database," Gracenote.com, Jan. 5, 2010, 2 pgs.

"Music ID," Gracenote.com, Jan. 5, 2010, 1 pg.

* cited by examiner

MEDIA PLAYBACK ACROSS MULTIPLE DEVICES

CROSS REFERENCE TO RELATED APPLICATIONS

This application is a Continuation of U.S. non-provisional application Ser. No. 13/828,972 titled "MEDIA PLAYBACK ACROSS MULTIPLE DEVICES" filed on Mar. 14, 2013, which is hereby expressly incorporated by reference in its entirety

TECHNICAL FIELD

The present technology pertains to media playback, and more specifically pertains to the playback of media items across multiple devices.

BACKGROUND

Recent advances in digital media technology has led to a rapid increase in the number of ways which digital media content such as images, text, audio items, and videos can be consumed. In the past, consumers were constrained to enjoying digital media content on their desktop computer or in their home. Today, digital media can be enjoyed at any time and in any place by using a variety of portable media devices.

Consumers generally own more than one media device and thus have many options for consuming digital media content, such as from a digital video recorder, desktop PC, laptop PC, tablet PC, or a smart phone. However, having multiple options does present some challenges. One difficulty is that each device can have a different user interface. Therefore, user interaction with a media item across multiple devices can be tedious and difficult. Another difficulty is that when a user migrates from one device to another, it can be difficult and inconvenient to resume playback on the new device.

For example, a viewer can be enjoying a media item on a large television in the home. The viewer can desire to migrate the playback of the media item to a portable handheld device due to a change in circumstances that results in the viewer needing to leave the home. To migrate the media item to the portable handheld device can be a tedious process that includes copying the media item over to the portable handheld device, starting up a media player application on the portable handheld device, locating the media item from storage of the portable handheld device, and searching through the media item to locate the point in which playback of the media item was interrupted on the large television. Hence, a significant amount of care and effort is required to migrate playback of media content from one device to another. Thus, there is a need for improved techniques for playing back media content across multiple devices.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for pausing playback of a media item on one device and resuming playback of the media item on another device.

In some embodiments, a user request to stop or terminate playback of a media item on a user device can be evaluated to determine whether there is a desire to resume playback of the media item. Variables such as the current playback position of the media item, the type of media item, and/or the user device playing back the media item can be evaluated to make the determination. If it is determined that there is a desire to resume playback of the media item, a playback record is generated or updated and transmitted to the server. A playback record is a record that represents a resumption point in a media item to resume playback of the media item. In some examples, the playback record includes a unique media item identifier and a bookmark position corresponding to the resumption point.

In some embodiments, graphical user interface objects can be generated and presented to the viewer to simplify the process of migrating playback of a media item from one device to another. The graphical user interface objects, which can be a banner, alert, or other notification, can identify a paused media item. The graphical user interface object can be presented to the viewer on a lock screen of a user device. Selection of the notification can result in automatically launching a media player application on the user device, loading the media item, and seeking through the media item until the bookmark position is reached. This can provide a seamless procedure to continue playback of a media item that is consistent for client devices having of different UI interfaces. Besides the lock screen, the notification can also pop over the display of an application running on the user device.

In another embodiment, the media queue can be utilized to personalize a media playback application. The user interface presented when the media playback application is launched can depend on the contents of the media queue (i.e., whether there are media items available for resumed playback). For example when the media queue is empty, a default user interface can present a viewer with a list of popular tasks to perform. Alternatively, a resume user interface can be presented with an ordered list of paused media items when a media queue is identified as containing bookmark positions of paused media items. Selection of a media item from the ordered list results in resumed playback of the media item on the user device.

In some embodiments, a media queue can be periodically updated by a server or client device by adding new records and/or pruning existing records according to constraints. Pruning may occur when there is a limit to the number of records that can be stored in the queue or a predefined TTL for each record. In other examples, different criteria can be used to update the media queue. When the media queue is updated, the server (or user device) can increment the version number of the media queue and distribute the updated media queue to other client devices in the system. Client devices receiving the updated media queue can determine whether to update the locally stored media queue based on the version number. In one example, the media queue is updated whenever a media playback application on a user device is launched. In another example, the media queue is updated according to a predetermined schedule. The schedule can be temporal or can be based on the number of changes that have been made to the media queue since the last update. In yet another example, the media queue is updated whenever a new record is created.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for systems, devices, techniques, and methods for playing back media content across multiple devices. Playback of a media item can be paused on a first device and then resumed on a second device. When a pause instruction is received during playback of a media item, a playback record to identify where playback of the media item has been terminated is generated and transmitted to a server to distribute to other devices that belong to the viewer. The playback record can include a unique media item identifier and a bookmark position. When one of the other devices receives the playback record, a selectable graphical user interface object can be presented on the display of the device. When selected, a media playback application stored on the device is launched and the playback record is analyzed to load the media item and to continue playback where the media item had been terminated earlier.

Figure 1:
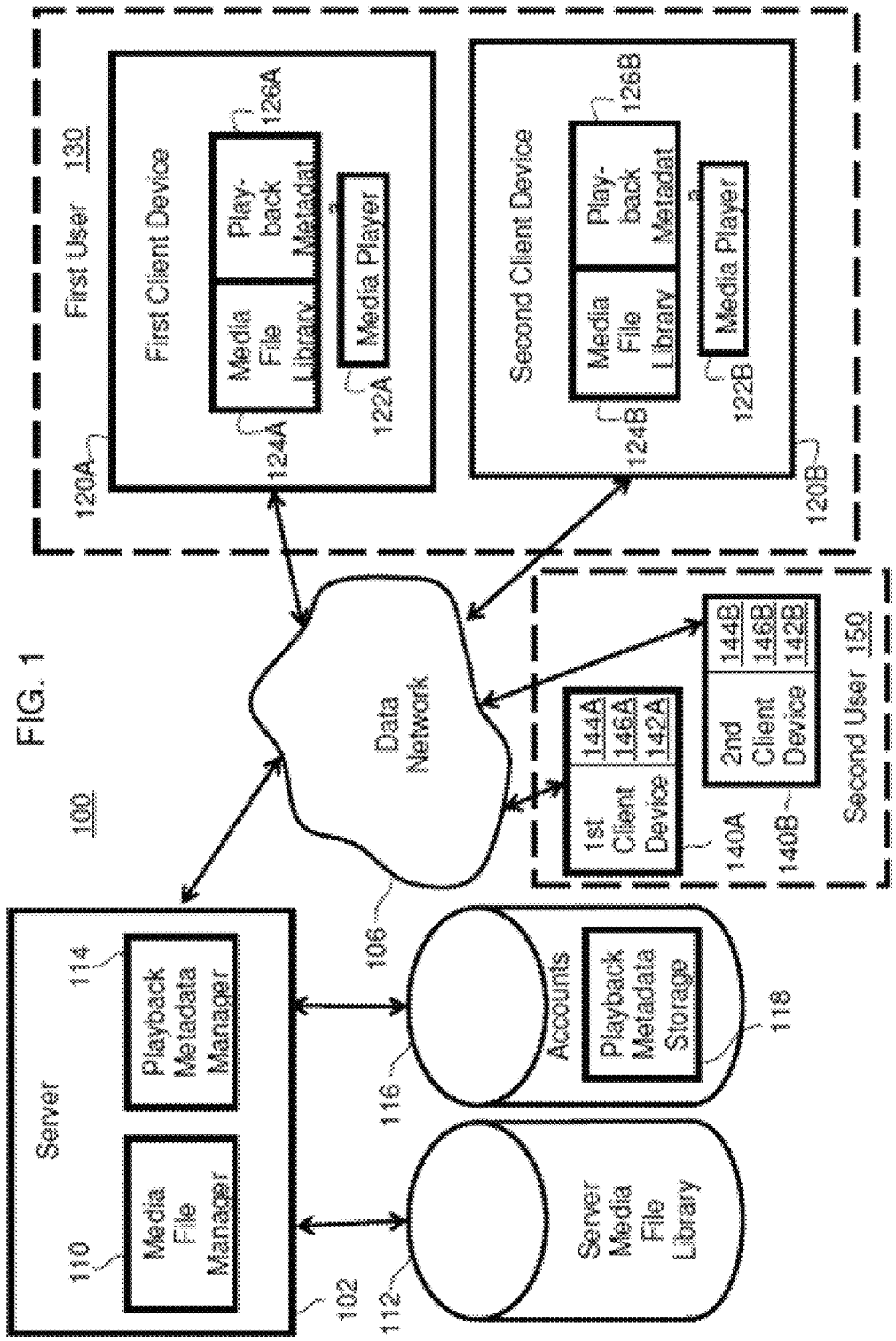
FIG. 1 illustrates an exemplary block diagram of a computer system 100 for managing the media queue access for a plurality of client devices.

FIG. 1 illustrates an exemplary block diagram of a computer system 100 for managing the media queue access for a plurality of client devices. The computer system 100 may comprise a server computer 102. As shown in FIG. 1, server computer 102 may be coupled to each of a plurality of client devices 120A, 120B, 140A, 140B of computer system 100 via data network 106. In one embodiment, the data network 106 comprises at least a portion of the Internet. Each of the client devices 120A, 120B, 140A, 140B may comprise a respective computer running software for interacting over data network 106 with software modules running on server computer 102 for a media file manager 110, as well as a playback metadata manager 114.

The server computer 102 may coordinate obtaining, storing, and/or accessing digital media items using the digital media file manager 110. As will be discussed in greater detail subsequently herein, the server computer 102 can also manage a media queue for various client devices, and more particularly, may update playback records of media queue using the playback metadata manager 114. Each playback record of the media queue can correspond to a media item that the client has previously paused. The playback record can contain data such as a bookmark position that allows resumed playback of the media item at the point which the client had left off. Records in the media queue can be organized based on criteria including a time stamp, media type, and the client device that generated the record, thus resulting in an ordered media queue. In some examples, the media queue can be trimmed or pruned according to different criteria, such as a TTL for each playback record or a certainty parameter signifying the likelihood that the viewer wishes to pause and resume playback of a media item when playback is terminated.

Each digital media item, or more particularly each digital media file for each digital media item, may be uniquely identified by a media file identification number. Media file identification numbers of the digital media files may be generated in various ways. For example, if a media file identification number is not already assigned to identify a digital media file, a hashing function may be used to generate the media file identification number by hashing metadata associated with the digital media file (e.g. by hashing a name of the digital media file together with other descriptive metadata, for example, an episode description). To facilitate storage of the digital media items, and to manage access to digital media items, the digital media file manager 110 of server computer 102 may be coupled with a server digital media file library 112. The server digital media file library 112 may store digital media items accessible within computer system 100.

Each one of various client devices may be uniquely identified by its respective client device identification number. Respective client device identification numbers may be electronically stored within each client device, and may be accessible over data network 106 by coupling of the various client devices thereto.

Each user of the computer system 100 may have a respective user account. A first plurality of client devices may be associated with a grouping of a first user and/or first user account, by associating the client device identification numbers of such client devices with the grouping of the first user and/or first user account. Such association may be recorded in a first user device record, which may be managed by server computer 102.

The foregoing is illustrated in FIG. 1 by first and second client devices 120A and 120B of a first user. The first and second client devices 120A and 120B may each be uniquely identified by their respective device identification numbers. The first and second client devices 120A and 120B may be associated with the grouping of the first user and/or first user account 130, by associating the client device identification numbers of such client devices with the grouping of the first user and/or first user account 130. In FIG. 1 the foregoing is representatively illustrated using a first dashed line box with the legend "First User 130", so as to show association of the first and second client devices 120A and 120B with the grouping of the first user and/or first user account 130.

As mentioned previously, such association may be recorded in the first user device record, which may be managed by server computer 102. Accordingly, in light of such association, it should be understood that the server computer 102 can identify the first user and/or first user account when any of the client devices of the first user access the server computer using device identification numbers of such client devices of the first user. This can be useful to associate communications received from a client device to a particular user.

Similarly, FIG. 1 shows first and second client devices 140A and 140B of a second user. The first and second client devices 140A and 140B of the second user may each be uniquely identified by their respective device identification numbers. The first and second client devices 140A and 140B of the second user may be associated with a grouping of the second user and/or second user account 150, by associating the client device identification numbers of such client devices with the grouping of the second user and/or second user account 150. In FIG. 1 the foregoing is representatively illustrated using a second dashed line box with the legend "Second User 150", so as to show association of the first and second client devices 140A and 140B of the second user with the grouping of the second user and/or second user account 150.

Such association may be recorded in a second user device record, which may be managed by server computer 102. Accordingly, in light of such association, it should be understood that the server computer 102 can identify the second user and/or second user account when any of the client devices of the second user access the server computer using device identification numbers of such client devices of the second user.

Each of the client devices 120A, 120B, 140A, 140B of computer system 100 may have its own respective digital media file library 124A, 124B, 144A, 144B and digital media player 122A, 122B, 142A, 142B for playing digital media items from its digital media file library. The client devices 120A, 120B, 140A, 140B can vary with application but generally are network accessible computing devices that have memory storage. Often, the clients 120A, 120B, 140A, 140B are personal computers or other computing devices (e.g., PDA, portable digital media player, mobile telephone) that may be capable of storing and displaying and/or otherwise presenting digital media to their users. Each of the digital media players 122A, 122B, 142A, 142B can be an application program (e.g., specific software application or web browser program) that operates on the client devices 120A, 120B, 140A, 140B. One popular example of the digital media player is the iTunes® client software.

The media file manager 110 of server 102 can facilitate synchronizing presence of digital media items in digital media file libraries within a grouping of client devices belonging to a user and/or user account. For example, media file manager 110 of server 102 can facilitate synchronizing presence of digital media items in digital media file libraries 124A, 124B of the first and second client devices 120A, 120B of the first user, since the first and second client devices 120A, 120B are associated with the grouping of the first user and/or first user account 130. By synchronizing and/or mirroring presence of digital media items in digital media file libraries 124A, 124B of the first and second client devices 120A, 120B, the digital media items are conveniently available to be played by the first user on both of the first and second client devices 120A, 120B. In one embodiment, a digital media item can be synchronized within a grouping of client devices belonging to a user account when playback of the digital media item is to be resumed by a client device in the grouping.

For example, if a media item present on one client device of the first user is absent from another client device of the first user, the media file manager 110 of server 102 can facilitate providing the first user with access to any such missing media items on any or all client devices of the first user by synchronizing and/or mirroring the digital media file libraries 124A, 124B. In some embodiments, to provide for such synchronization, the media file manager 110 of the server 102 may locate in the server media file library 112 the digital media file for the digital media item that is missing from one of the client devices, and transmit this digital media file to that one of the client devices. In other embodiments, the synchronization can be peer to peer where one client device transmits the digital media file to another client device.

Similarly, the media file manager 110 of server 102 can likewise facilitate synchronizing presence of digital media items in digital media file libraries of the first and second client devices 140A, 140B of the second user, since the first and second client devices 140A, 140B are associated with the grouping of the second user and/or second user account 150.

In one implementation, system 100 can operate without media file manager 110. For example, the media files can be streamed directly from the publisher's servers. For instance, podcast episodes can be directly streamed from a publisher's server.

In some implementations, some or all of the digital media files contained within the digital media file libraries 124A, 124B, 144A, 144B may be associated with playback metadata 126A, 126B, 146A, 146B. Playback metadata can include a playback record related to the playback status of the digital media item. The playback metadata can also include a media queue containing one or more playback records. For example, on the first client device 120A of the first user, a digital media file of a particular video media item may be paused and a playback record can be generated or updated. The playback record can include a bookmark position of the digital media file describing the digital media file being paused at a particular playback position when the first user pauses playback of the digital media item on the first client device 120A. Playback metadata can include a status describing whether the digital media file has been played and/or a status describing a number of times the digital medial file has been played.

The first client device 120A may communicate the playback metadata of the first client device to the server 102 via the data network 106, for example, by sending a first write request for playback metadata to the playback metadata manager 114 of the server 102. The playback metadata 126 may include a playback record of a digital media file (e.g. video media item) on the first client device 120A. For example, the playback metadata 126A may include a playback record relating to the pause status of the particular video media item, as just discussed.

Furthermore, when the playback metadata manager 114 of server 102 receives the first write request for playback metadata from the first client device 120A, the first write request may identify the digital media file that is related to the playback metadata, for example, by using the media file identification number for the digital media file.

Additionally, the first write request may identify the first user account and/or the first user. Such identification may be direct, or may be indirect. For example, the first write request may include the device identification number of the first client device 120A. For example, the first client device 120A may have a client device identification number "441029". As mentioned previously, using associations that may be recorded in the first user device record, server computer 102 can identify the first user and/or first user account when any of the client devices 120A, 120B of the first user access the server computer 102 using device identification numbers of such client devices of the first user.

The various identification items just discussed may be included together in the first write request. Any of the various identification items just discussed may comprise a key in the first write request. For example, the digital media file (e.g. video media item) that has the paused status on the first client device 120A and is related to the playback metadata of the first write request may have a media file identification number "5512345." Accordingly, in this example, the various identification items may comprise a key in the first write request of "5512345" having a value that is associated with the playback position value of the playback metadata to provide a key-value pair. This key-value pair may also be associated with a base version number, which may be an integer (which can be incremented) for tracking revisions of the playback metadata 126A on the first client device 120A. A client device can make a determination on whether to update its playback metadata by comparing the base version number of its playback metadata to the domain version number stored on the server. Alternatively, a timestamp of the client device's playback metadata can be compared to the timestamp stored on the server. The timestamp can correspond to an event in which a user interaction triggers a revision to the playback metadata. Using timestamps that are based on a user interaction event can allow the most recent user interaction events to take priority. This can be particularly useful in scenarios where the connection with the server is intermittent, thus creating the possibility of an earlier user interaction event overriding a later user interaction event. In contrast, basing the changes on a version can result in the last write winning conflicts rather than the most recent user interaction.

When the playback metadata manager 114 of server 102 receives the first write request for playback metadata from the first client device 120A, the playback metadata manager 114 may identify an account of the first user using the client device identification number (e.g. "441029") of the first client device 120A, and may use the key to locate and retrieve a playback record or media queue in the first user account of playback metadata storage 118 in accounts storage 116. This playback record or media queue may relate to the particular digital media file (e.g. "5512345") for the first user. Additionally, this playback record or media queue includes a version number, which may be an integer that can be incremented for tracking revisions of the playback metadata in the account of the first user in the playback metadata storage 118 in the accounts storage 116.

The playback metadata manager 114 of server 102 may compare the domain version number of the playback record and the base version number of the playback metadata of the first write request. The playback metadata manager 114 of server 102 may transmit a version conflict notification to the first client device 120A based upon comparison of the domain version number of the playback record and the base version number of the playback metadata of the first write request (for example, if the comparison shows that the base version number is smaller, or earlier than the domain version number). The playback metadata manager 114 of server 102 may determine whether to update the playback record based at least in part upon the comparison of the base version and the domain version number. Once the playback metadata manager 114 of server 102 has determined to update the server record, the playback metadata manager 114 may update the media queue in the accounts storage 116. Further, the domain version number may be updated when the media queue is updated. In other examples, a time stamp can be used alone or in combination with the techniques above to resolve conflict between the playback record and the first write request. A time stamp can be associated with a user action that causes an update to occur. By comparing the time stamps, the latest user action will prevail during conflicts.

The server 102 may be coupled to accounts storage 116 for the various users of computer system 100. In general, each user account in the accounts storage 116 may have respective playback metadata storage 118 for each user. The accounts storage 116 may comprise a database, and may be accessed by the playback metadata manager 114 of server 102, for accessing and/or retrieving and/or updating server records relating to the various users. In particular, the playback metadata manager 114 of server 102 may access and/or retrieve and/or update server records relating to media queue of digital media files by each of the users of the computer system 100. Accordingly, the playback metadata manager 114 of server 102 may access and/or retrieve and/or update the playback records or media queue relating to the first user.

The server 102 may communicate to the second client device 120B the media queue of the first client device 120A. The communication can include pushing notifications (i.e., server records, update records, or other playback metadata relating to the resumed playback of media content) to a client device or responding to client requests to pull the notifications from the server. In a push example, the playback metadata manager 114 of server 102 may push playback metadata to the second client device 120B in response to updates to a playback record relating to the user of the second client device 120B. In a pull example, the playback metadata manager 114 of server 102 may receive a first read request for playback metadata from the second client device 120B and respond to the read request. The first read request can be transmitted from the second client device 120B during the course of polling for changes on the server.

When the playback metadata manager 114 of server 102 receives the first read request for playback metadata from the second client device 120B, the first read request may identify the first user account and/or the first user. As discussed previously, such identification may be direct, or may be indirect. For example, the first read request may include the device identification number of the second client device 120B (e.g., a client device identification number "441030"). As mentioned previously, using associations that may be recorded in the first user device record, server computer 102 can identify the first user and/or first user account when any of the client devices 120A, 120B of the first user access the server computer 102 using device identification numbers of such client devices of the first user.

Just as discussed previously herein with respect to the first write request of the first client device 120, the various identification items just discussed may be included together in the first read request. Any of the various identification items just discussed may comprise a key in the first read request. Accordingly, just as with the first write request discussed previously, in this example, the various identification items may comprise a key in the first read request of "5512345". In the first read request, this key may be associated with the bookmark position value of the playback metadata to provide the key-value pair. This key-value pair may also be associated with a base version number, which may be an integer (which can be incremented) for tracking revisions of the playback metadata 126B on the second client device 120B. The base version number can be used in tracking changes to the bookmark position as the media item is paused and resumed across multiple client devices.

When the playback metadata manager 114 of server 102 receives the first read request for playback metadata from the second client device 120B, the playback metadata manager 114 may identify an account of the first user using the client device identification number (e.g. "441030") of the second client device 120B, and may use the key (e.g. "5512345") to locate and retrieve a playback record in the first user account of playback metadata storage 118 in accounts storage 116. This playback record may be part of a media queue for the first user. Additionally, this playback record may comprise the domain version number, as discussed previously. The playback metadata manager 114 may compare the domain version number to the base version number of the first read request to determine which playback record is more up to date.

Once the playback record (or media queue) of the playback metadata is retrieved, the playback metadata manager 114 of server 102 may transmit the playback metadata to the second client device 120B in response to the first read request from the second client device. The digital media file may be displayed on the second client device 120B in accordance with the status of the particular playback position of the digital media file as discussed previously. Playback of the digital media file may resume on the second client device 120B at the particular playback position where the media content was paused on the first client device 120A.

In the example just discussed the first user can pause play of the particular digital media file at a particular playback position on the first client device 120A of the first user, and then resume play of the particular digital media file at that particular playback position on the second client device 120B of the first user. This may be facilitated by the playback metadata manager 114 of server computer 102 receiving the first write request for playback metadata from the first client device 120A of the first user. For example, the first client device 120A may initiate the first write request when playback is paused on the first client device. The playback metadata manager 114 of server computer 102 may receive the first read request for playback metadata from the second device 120B of the first user. For example, the second client device 120B may initiate the first read request when the second client device 120B is activated, or may initiate the first read request when the second client device 120B engages in a media activity.

In some embodiments that first client device 120A may be a portable multifunction client device 120A having a touchscreen display. In such case, the first write request for playback metadata may be descriptive of the playback status of media content being displayed on the touch screen display of the portable multifunction client device. In particular, the first write request may be descriptive of status of progress of the portable multifunction device 120A in playing the media content on the touch screen display. The receiving of the first write request at the server computer 102 may be in response to a predefined gesture on the touch screen display or a media activity of the portable multifunction client device.

The receiving of the first write request at the server computer 102 may be in response to pausing or stopping of the displaying media content on the touch screen display of the portable multifunction client device 120A. The first write request may be descriptive of a playback position related to the pausing or stopping of the displaying media content on the touch screen display of the portable multifunction client device 120A (i.e., bookmark position)

The playback metadata manager 114 of server computer 102 may generate an updated media queue or playback record in response to receiving the first write request from the portable multifunction client device 120A. The playback metadata manager 114 of server computer 102 may store the updated media queue or playback record in the first user account of playback metadata storage 118 in accounts storage 116.

In some embodiments, the second client device 120B of the first user may be a remote client device 120B with a remote display. The playback metadata manager 114 of server computer 102 may receive the first read request from remote client device 120B. The receiving of the first read request at the server computer 102 may be in response to a media activity of the remote client device 120B.

The playback metadata manager 114 of server computer 102 may transmit the updated playback record or media queue to the remote client device 120B. The transmitting of the updated playback record or media queue from the server computer 102 to the remote client 120B may provide for display of the media content on the remote display of the remote client 120B in accordance with the status of the portable multifunction client device 120A. In particular, the transmitting the updated playback record or media queue from the server computer 102 to the remote client device 120B may provide for playing the media content corresponding to a playback record on the remote display in accordance with the status of progress of the portable multifunction client device 120A in playing the media content on the touch screen display. The transmitting of the updated playback record or media queue from the server computer 102 to the remote client device 120B may provide for resuming playback display of the media content on the remote display of the remote client device, in accordance with the playback position of the pausing or stopping of the displaying media content on the touch screen display of the portable multifunction client device 120A.

While the foregoing examples focused on the media activity of the first user on the first and second client devices 120A, 120B of the first user, the computer system 100 may likewise accommodate media activity of the second user, on the first and second client devices 140A, 140B of the second user. The second user can pause play of a particular digital media file just discussed (the same or different media file) at a particular playback position on the first client device 140A of the second user, and then resume play of the particular digital media file at that particular playback position on the second client device 140B of the second user. This may be facilitated by the playback metadata manager 114 of server computer 102 receiving a second write request for playback metadata from the first client device 140A of the second user. The playback metadata manager 114 of server computer 102 may receive a second read request for playback metadata from the second device 140B of the second user.

Figure 2:
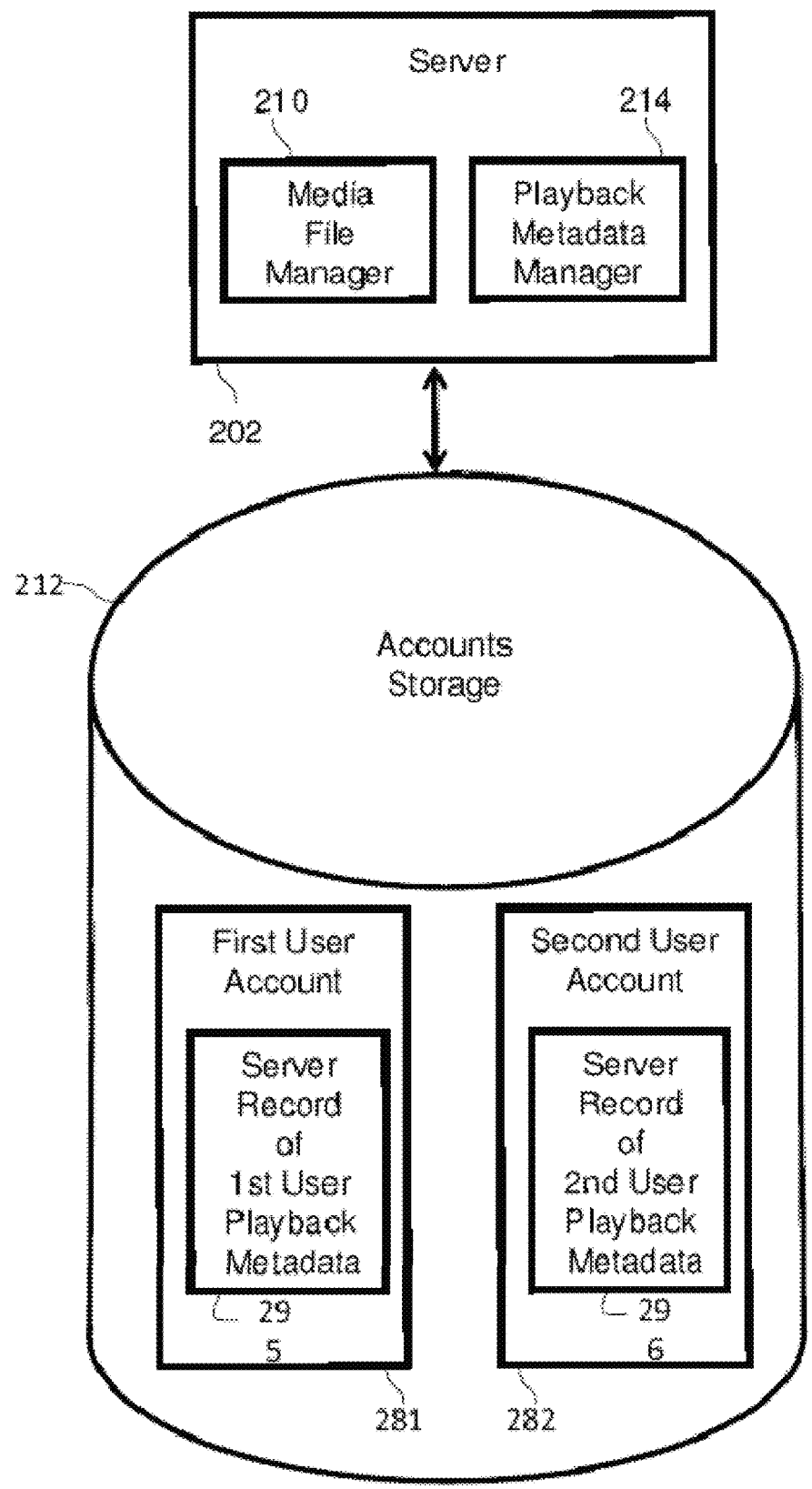
FIG. 2 illustrates an exemplary simplified detailed block diagram of server 102 and accounts storage 116 shown in FIG. 1.

FIG. 2 illustrates an exemplary simplified detailed block diagram of server 102 and accounts storage 116 shown in FIG. 1. FIG. 2 shows media file manager 210 and playback metadata manager 214 of server computer 202. The playback metadata manager 214 of server computer 202 may be coupled to accounts storage 212 for accessing and/or retrieving and/or updating the server record 295 of the first user playback metadata in the first user account 281. Similarly, the playback metadata manager 214 of server computer 202 may be coupled to accounts storage 212 for accessing and/or retrieving and/or updating the server record 296 of the second user playback metadata in the second user account 282. Each server record can be configured to store metadata related to a specific user. The metadata can include the client device identification numbers for each client device that belongs to or is associated with the specific user. The metadata can also include a playback record associated with a media item that has paused playback on a device from the group of client devices can be resumed on another device from the group. The metadata can also include a media queue to manage and order the playback records.

The playback metadata manager 214 of server computer 202 may be coupled to accounts storage 212 for accessing and/or retrieving and/or updating a respective domain-wide version number, which may be associated with each user account 281, 282. For each user account 281, 282 the playback metadata manager 214 may update (e.g. increment) the respective domain-wide version number when server records associated with each user account 281, 282 are updated. By comparing version numbers on the server and on a client device, changes to the media queue can be shared with client devices that are associated with the first user.

In some examples, a respective domain-wide version number associated with each user account 281, 282 may be employed by the playback metadata manager 214 for improving speed and/or efficiency in updating playback metadata for respective client devices associated with each user account 281, 282. In other words, the respective domain-wide version number associated with each user account 281, 282 may be used by the playback metadata manager 214 as a fast way for client devices associated with each user account 281, 282 to request all changes for each user account 281, 282 since the last (most recent previous) update request. In this way, using the respective domain-wide version number for each user account, server computer 202 may avoid transmitting, and client devices may avoid requesting and/or receiving, records that were not updated since the last (most recent previous) update request for each user account. Using the respective domain-wide version number for each user account, client devices may request and/or receive only records that were updated since the last (most recent previous) update request for each user account (i.e. "delta" or difference records that are different or updated.)

For example the playback metadata manager 214 of server computer 202 may be coupled to accounts storage 212 for accessing and/or retrieving and/or updating a first domain-wide version number, which may be associated with first user account 281. For the first user account 281, the playback metadata manager 214 may update (e.g. increment) the first domain-wide version number when server records associated with first user account or a media queue containing server records is updated.

The first domain-wide version number associated with the first user account 281 may be employed by the playback metadata manager 214 for improving speed and/or efficiency in updating playback metadata for first and second client devices of the first user, which may be associated with first user account 281. In other words, the first domain-wide version number associated with the first user account 281 may be used by the playback metadata manager 214 as a fast way for client devices of the first user to request all changes for the first user account 281 since the last (most recent previous) update request. In this way, using the first domain-wide version number, client devices of the first user may avoid requesting and/or receiving records that were not updated since the last (most recent previous) update request. Using the first domain-wide version number, client devices of the first user may request and/or receive only records that were updated since the last (most recent previous) update request for the first user account.

Similarly, the playback metadata manager 214 of server computer 202 may be coupled to accounts storage 212 for likewise accessing and/or retrieving and/or updating a second domain-wide version number, which may be associated with the second user account 282. Using the second domain-wide version number, client devices of the second user may request and/or receive only records that were updated since the last (most recent previous) update request for the second user account.

In some embodiments, a client device receiving updates to a media queue or a playback record can present the updates as one or more notifications on a display of the client device. The updates can be received from a server or another client device. In some examples as discussed above, the updates can be pushed down by the server or another client device to the client device. Alternatively, the updates can be pulled by the client device from a server or another client device. A notification can serve to remind the user that a previously paused media item is available for playback. A notification can also serve as a means to instruct the client device to begin playback of the media item via a default media player application when the notification is selected.

Figure 3:
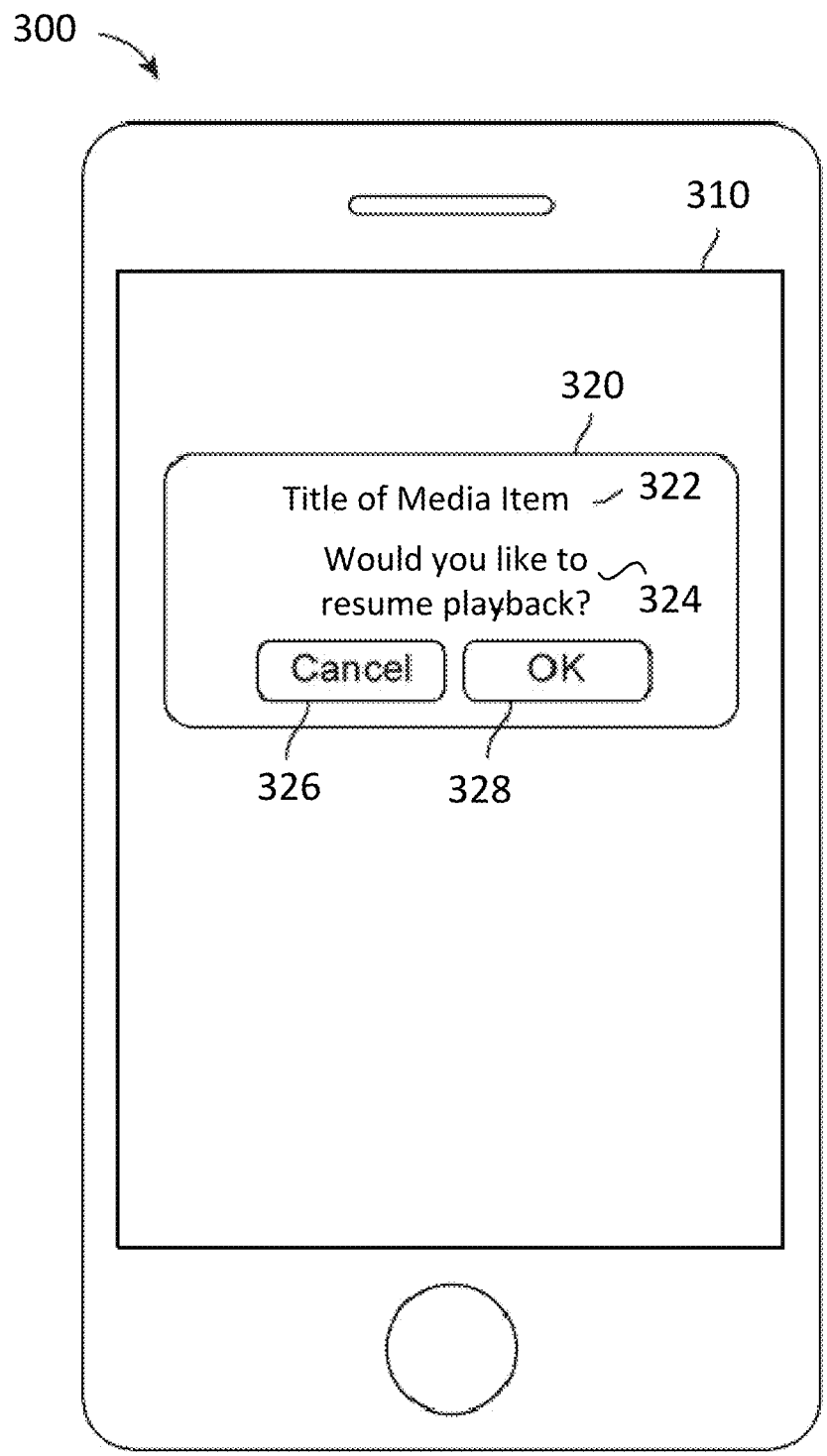
FIG. 3 illustrates an exemplary client device presenting a notification.

FIG. 3 illustrates an exemplary client device presenting a notification. As shown in FIG. 3, client device 300 includes display 310. When an update is received, client device 300 can generate notification 320 for presentation on display 310. The notification can be presented simultaneously with a vibration, lights, and/or and audio tone to notify a user of the generated notification.

Here, notification 320 is an alert that includes a subject line 322 and text 324. Alerts are configured to pop up and overlay items currently being presented on display 310. Once an alert has overlayed items presented on display 310, the alert remains until a user action is received to respond to the alert. An alert can also time out after a predetermined duration. In this example, the alert is configured to notify the user of a media item available to resume playback. Subject line 322 provides the title of the media item while text 324 provides a prompt asking the user whether he/she would like to resume playback of the media item mentioned in subject line 322. In other examples, different information and prompts regarding a media item can be presented in notification 320.

Notification 320 also includes two selectable icons 326 and 328. Icon 326 is configured to trigger an instruction to delete the notification while icon 328 is configured to trigger instructions to continue playback the media item according to where the media item was previously paused. In some examples, deleting the notification from one client device can trigger an update to the media queue. For instance the playback record associated with the media item can be deleted from the media queue. Updates to the media queue can be communicated to the server, which in turn can update the media queues stored locally on each client device. In other examples, notification deleted from the display screen still remain in a notification center of the client device. In essence, deletion of notification 320 results in archiving the notification in a notification center. Notifications archived in the notification center are accessible to the user.

Besides an alert, the notification can alternatively be a banner displayed alongside a border of display screen 310. The banner can be selectable where selection of the banner automatically launches a media playback application on the client device and loads the media item that corresponds to the notification. Once loaded, the media playback application can resume playback starting from a bookmark position that is associated with the notification. In another example, the notification can be transmitted to an email account or other account associated with the user of client device 300 instead of being displayed on display screen 310. By communicating the notification to the user via other means than a display on a client device, the user is no longer limited to continuing playback of the media item on devices belonging to the user. For example, a first user, using a browser on a client device associated with a second user, can access his email to review the notification. The email notification can include a link that when followed, contains instructions to launch a default media player application on the second user's client device and to resume playback of the media item associated with the notification by loading the media item to the default media player application. In other embodiments, other types of notifications can be used.

Figure 4:
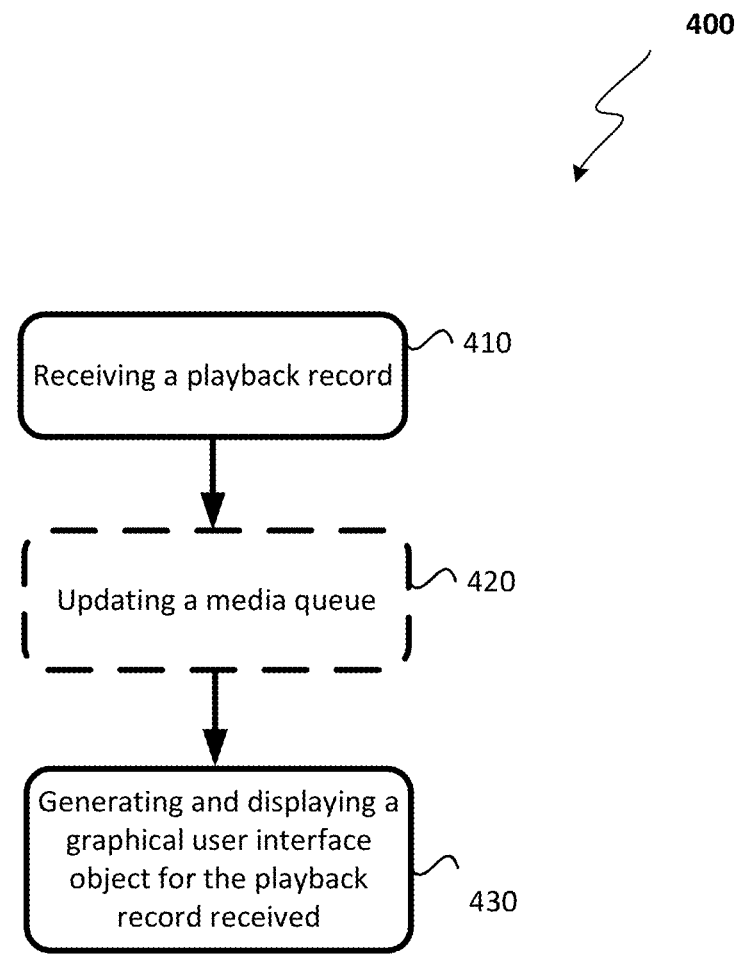
FIG. 4 illustrates an exemplary process to display a notification on a display screen of a client device.

FIG. 4 illustrates an exemplary process to display a notification on a display screen of a client device. The process can be performed by a client device in the group of client devices belonging to a user account. Process 400 begins with the client device receiving a playback record at 410. The playback record can be received in response to a request from the client device. Alternatively, the playback record can be pushed to the client device.

Once the playback record has been received, a media queue of the client device can optionally be updated at 420. Updating the media queue can include performing maintenance such as removing records from the queue that have an expired TTL or pruning records in the media queue to maintain the size of the queue. In one example, the media queue can be periodically maintained to provide playback records that are meaningful to the user. Maintenance can include pruning the media queue to a maximum size since presenting too many records to the user can result in confusion. Maintenance can also include removing records in the media queue that are older than a predefined threshold. It is generally unlikely that a user will want to resume a media items that has been paused for an extended period of time. Once the media queue has been optionally updated, a graphical user interface object related to the playback record is generated and displayed at 430. In other examples, a media queue containing playback records can be received. The playback records received can be compared against existing playback records in the media queue. Playback records that were previously not part of the media queue can be optionally be marked as such and be displayed as graphical user interface objects on the display.

Figure 5:
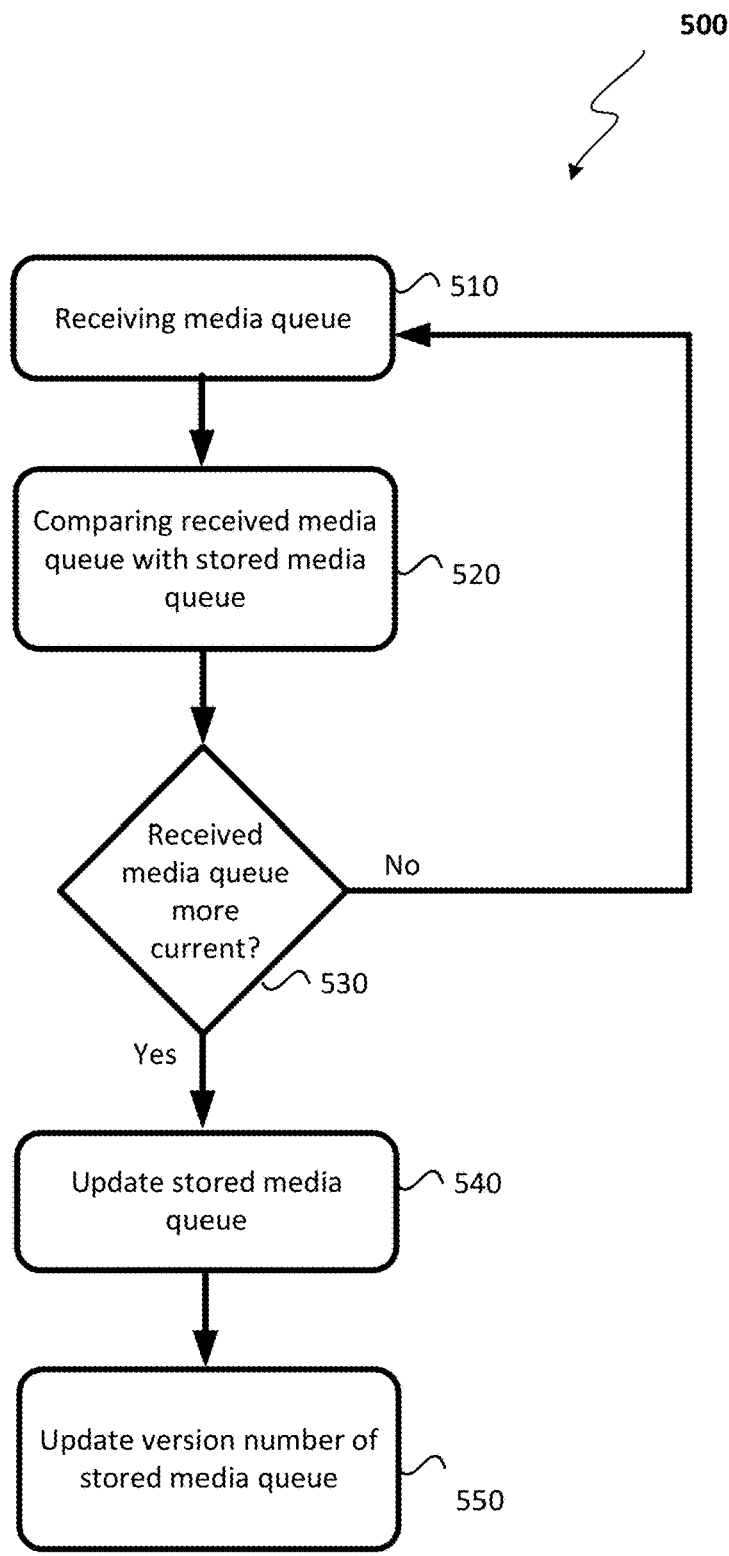
FIG. 5 illustrates an exemplary process for updating a media queue.

FIG. 5 illustrates an exemplary process for updating a media queue. The process can be performed on a server or a client device. Process 500 begins by receiving a media queue at 510. The media queue can be received from a server or a client device. In one example, one or more devices from a group of client devices can transmit a media queue.

After receiving the media queue, a comparison is made between received media queue and the stored media queue at 520. In some examples, the version number of the received media queue is compared with the version number of the stored media queue at 520. The version number of the media queues can be stored as metadata on the respective media queue. A determination is then made as to whether the received version number is more current than the stored version number at 530. In some examples, the determination can be made by comparing the two version numbers, where the larger version number is determined to be more current than the other. In other examples, the determination can be made according to how the two version numbers are compared in 520. In yet other examples, the determination can be made by comparing other metadata associated with the media queues.

If the received media queue is not more current than the stored media queue (e.g., the version number of received media queue is less current than the version number stored), no action is taken and the received media queue is discarded. Alternatively if the received media queue is more current, the stored media queue is updated at 540. In one example, updating the stored media queue includes replacing the stored media queue with the received media queue. In another example, updating the stored media queue includes merging the contents of the stored media queue with the contents of the received media queue. Contents such as playback records that are new or have been updated when compared to the contents of the stored media queue can be flagged for display as a notification on a client device.

Figure 6:
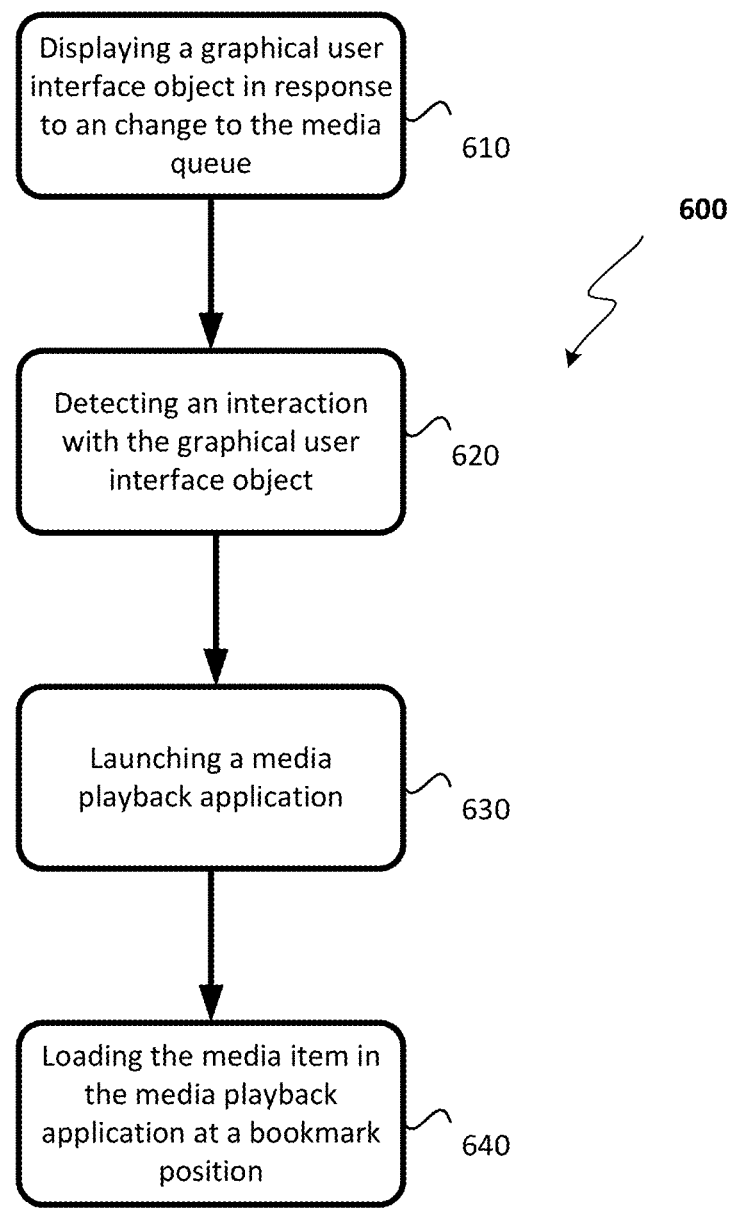
FIG. 6 illustrates an exemplary process to resume playback of a media item.
Figure 7:
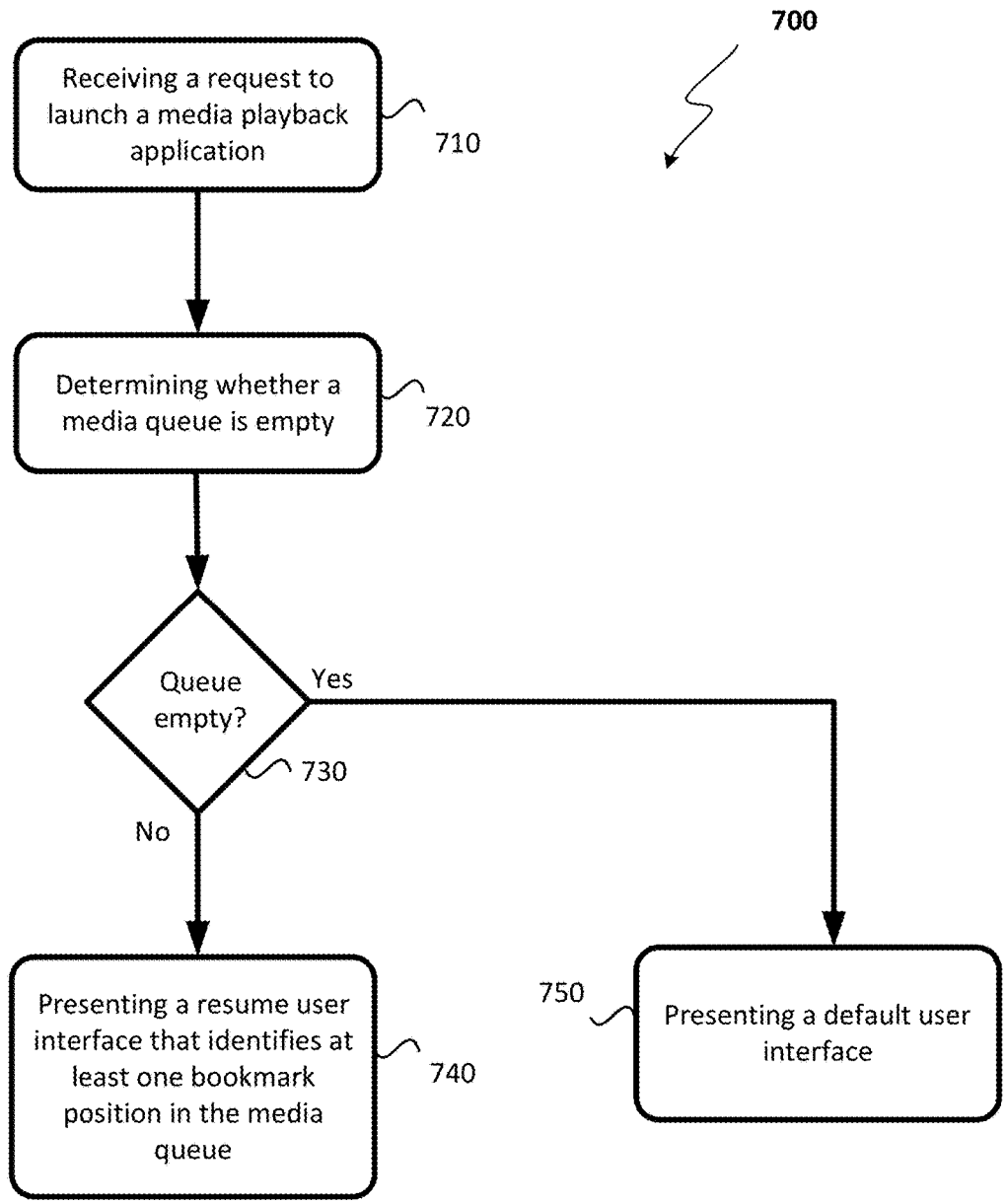
FIG. 7 illustrates an exemplary process to launch a media playback application.

Once the stored media queue has been updated, the version number associated with the stored media queue is also updated at 550. The update can be simply replacing the stored version number with the received version number. Alternatively, the stored version number can be incremented to update the version number. In some examples, the contents of the stored media queue can be presented in multiple ways. For example, new playback records can be presented as a notification on a display as described in FIG. 3. As another example, the media queue can be presented when a notification center is being presented. Selecting a playback record while in the notification center can instruct the client device to launch a media playback application, load a media item associated with the playback record into the media playback application, and begin playback of the media item according to the bookmark position of the playback record. In some examples, contents of the media queue, if any, can be presented or utilized by the client device. FIGS. 6 and 7 illustrate two examples of how the media queue can be utilized by a client device.

FIG. 6 illustrates an exemplary process to resume playback of a media item. In some examples, process 600 can follow process 400 of FIG. 4. Process 600 can be performed on a client device. Process 600 begins by displaying a graphical user interface object (GUI object) in response to a change to the media queue at 610. The change to the media queue can be an addition of or an update to a playback record to the media queue where the GUI object corresponds to the newly added playback record. In some examples, the playback record can be received from a server as a result of a user pausing playback of a media item on a client device associated with the user. In some examples, the media item can be downloaded to the client device if it is not being stored on the client device.

After displaying the GUI object, process 600 can detect an interaction with a GUI object. The interaction can be a user selecting the GUI object, pressing an icon (such as icon 326 and 328 of FIG. 3), or other. Upon detection of the interaction, a media playback application is launched at 630. In some examples, the media playback application can be automatically launched once a specified interaction with the GUI object is detected. After launching the media player application, a media item corresponding to the playback record is loaded into the media player application and playback is advanced to a bookmark position at 640.

FIG. 7 illustrates an exemplary process to launch a media playback application. The process can be performed by a client device. Process 700 begins by receiving a request to launch a media playback application at 710. The request can be the selection of a user interface object corresponding to the media playback application such as an icon. Once the request is received, a determination is made as to whether the media queue is empty at 720. If the media queue is empty at 730, a default user interface can be presented by the media playback application at 750. The default user interface can include icons or topics related to common tasks of the media playback application. For example, a default GUI can present options to open a file or create a new file. Alternatively if the media queue is not empty, a resume user interface can be presented at 740. The resume user interface can include at least one playback record in the media queue. In some examples, only playback records which have been updated to the media queue are presented on a resume GUI while in other examples, all of the playback records in the media queue are presented. In yet other examples, any combination of the bookmark positions in the media queue are presented to the user. The playback record can be presented to the user as a selectable GUI object which upon selection, loads the media item corresponding to a current playback position related to when the media item was previously paused, on this client device or another client device that belongs to a group of devices associated with a user account.

Figure 8:
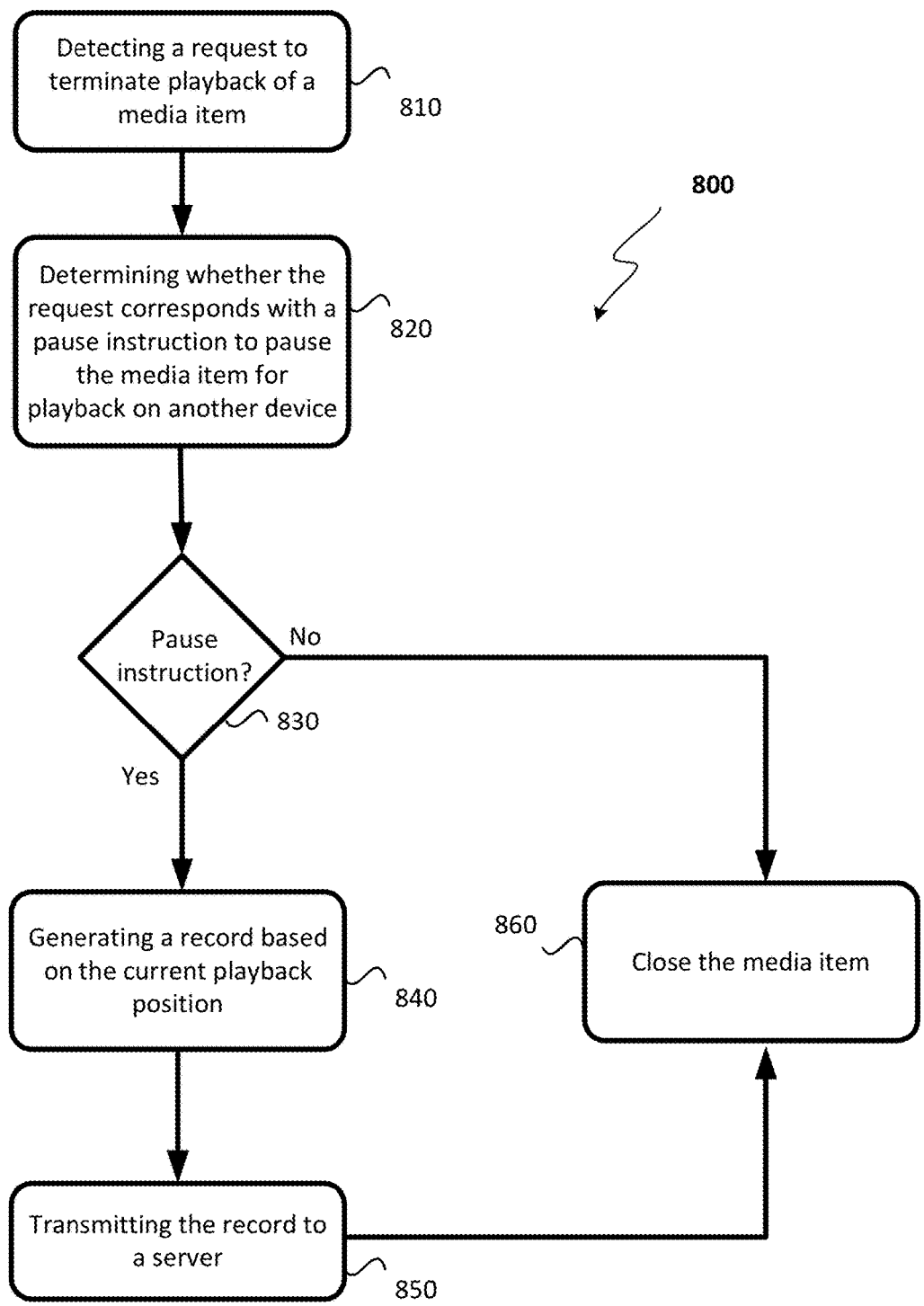
FIG. 8 illustrates an exemplary process for generating a bookmark position.

FIG. 8 illustrates an exemplary process for generating a bookmark position. Process 800 can be performed by a client device. When playback of a media item terminates on a client device, process 800 can include logic to determine whether resumed playback of the media item is desired. Process 800 begins by detecting a request to terminate playback of a media item at 810. The request to terminate playback can be pressing a home button on the client device, quitting the media player application, or switching from the media player application to another application.

Once the request to terminate playback is detected, a determination is made whether the request corresponds with a pause instruction to pause the media item for playback on another device at 820. The determination can be based on satisfying at least one rule or criteria. In one embodiment, the determination can take into consideration a rule which is based on whether the media item has been played for less than a predefined period of time. Generally, termination of playback of a media item before a predefined threshold period of time has been played implies that the user does not intend to resume playback. For example, it can be determined that resumed playback is not desired for a media item which is loaded by the user and played for 30 seconds before receiving a user request to terminate playback. In some examples, the predefined period of time can vary according to media type. For example, the predefined period of time for a song can be a minute while the predefined period of time for a movie can be five minutes. In another embodiment, the determination can take into consideration a rule which is based on the type of media item being played. For example, a rule can specify that audio files should not be resumed or specify that only video files shall be resumed.

In yet another embodiment, the determination can take into consideration a rule which is based on the current playback position of the media item when the request to terminate is received. The rule can be a positive rule (i.e., request corresponds with a pause instruction when the rule is met) or a negative rule (i.e., request does not correspond with a pause instruction when the rule is met). In some examples, the rules can depend on a pause position of the media item. The pause position can be a time, scene, bookmark, or other identified point or portion of the media item that is labeled as the pause position. The pause position can be labeled using flags or other markers that correspond to specific portions of the media item. The flags, which can identify an introduction portion of the media item, a body of the media item, a credits portion of the media item, a title screen of the media item, or other sections/portions of the media item, can be stored as metadata of the media item. In one example, a negative rule can specify that a request to terminate playback of a media item that is received when the current playback position is within the introduction portion of the media item (such as the opening scene or introduction of a movie) does not correlate with a pause instruction. This is because the user is unlikely interested in continuing playback of the media item since the user has not begun playback of the body of the media item. In another example, a negative rule can specify that a request to terminate playback of a media item that is received when the current playback position is within a credits portion of the media item should not be paused for subsequent resumed playback of the media item. This is because users will intentionally terminate playback of a media item at the credits portion when there is no interest in watching the credits.

In other embodiments, positive rules can also be used in making the determination. For example, a positive rule can specify that a request to terminate playback of a media item received within a predefined portion of the media item is correlated with a pause instruction for subsequent resumed playback of the media item. The predefined portion can be identified via a beginning and end boundary flag (i.e, first threshold playback position and second threshold playback position) of the media item. In one example, the positive rule can check to determine whether the current playback position exceeds a first threshold playback position, but not a second threshold playback position.

If the request does not correspond to a pause instruction an 830, the media item is closed. Alternatively if the request does correspond to a pause interaction at 830, process 800 continues by generating a playback record based on the current playback position of the media item at 840. The playback record can include two fields: a media item identifier to uniquely identify the media item and a bookmark position to store the current playback position of the media item. The bookmark position can allow a client device to resume playback of the media item where termination of the media item was detected. After the playback record is generated, the playback record is transmitted to a server at 850. If the device does not have connectivity when the media playback is paused, playback record can be queued and sent to the server the next time the device has internet connection. In some examples, the playback record can be transmitted to a client in lieu of or in combination with the server. Once the playback record has been transmitted, the media item is closed at 860.

Figure 9:
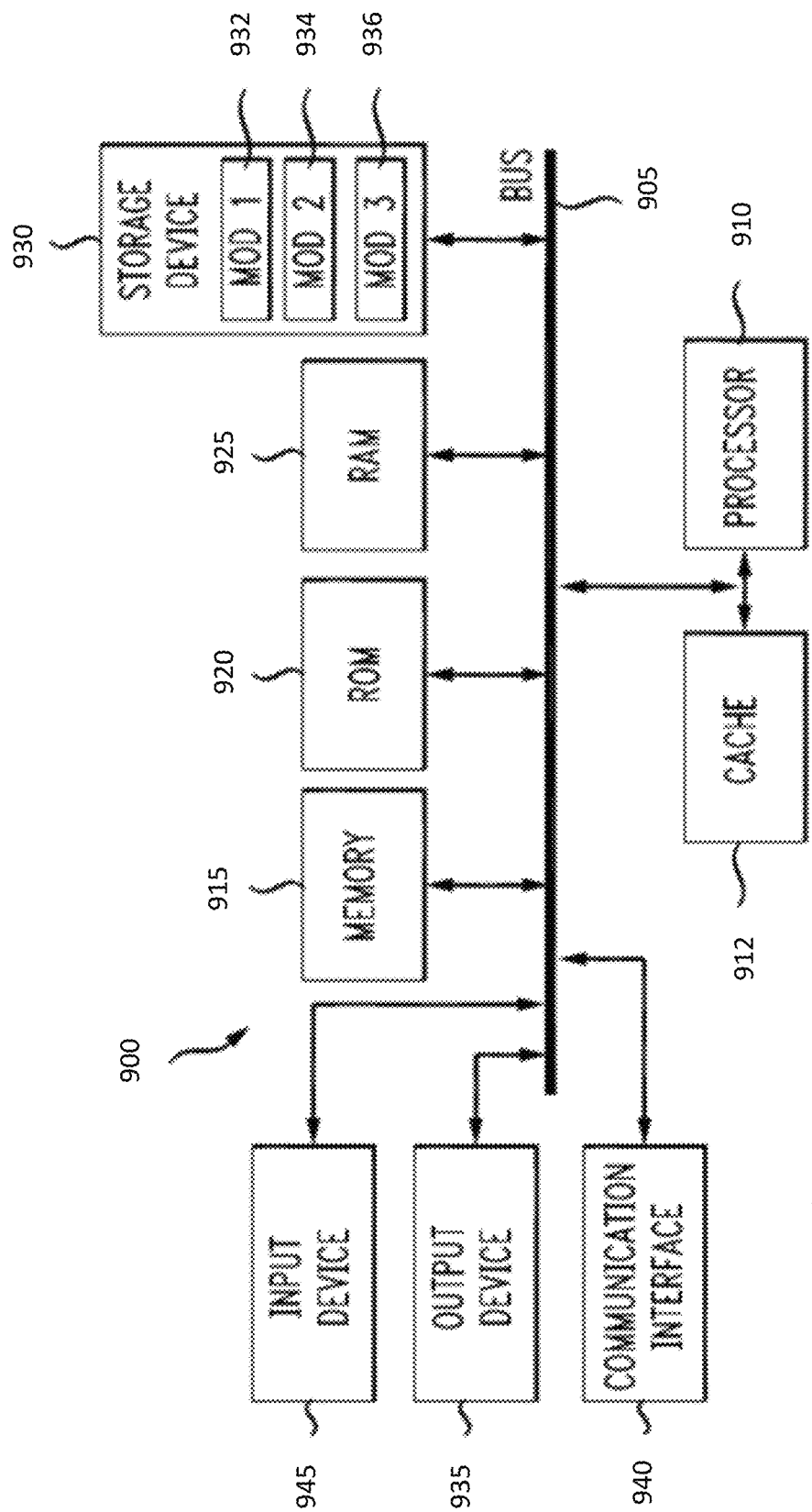
FIG. 9 illustrates a conventional system bus computing system architecture.
Figure 10:
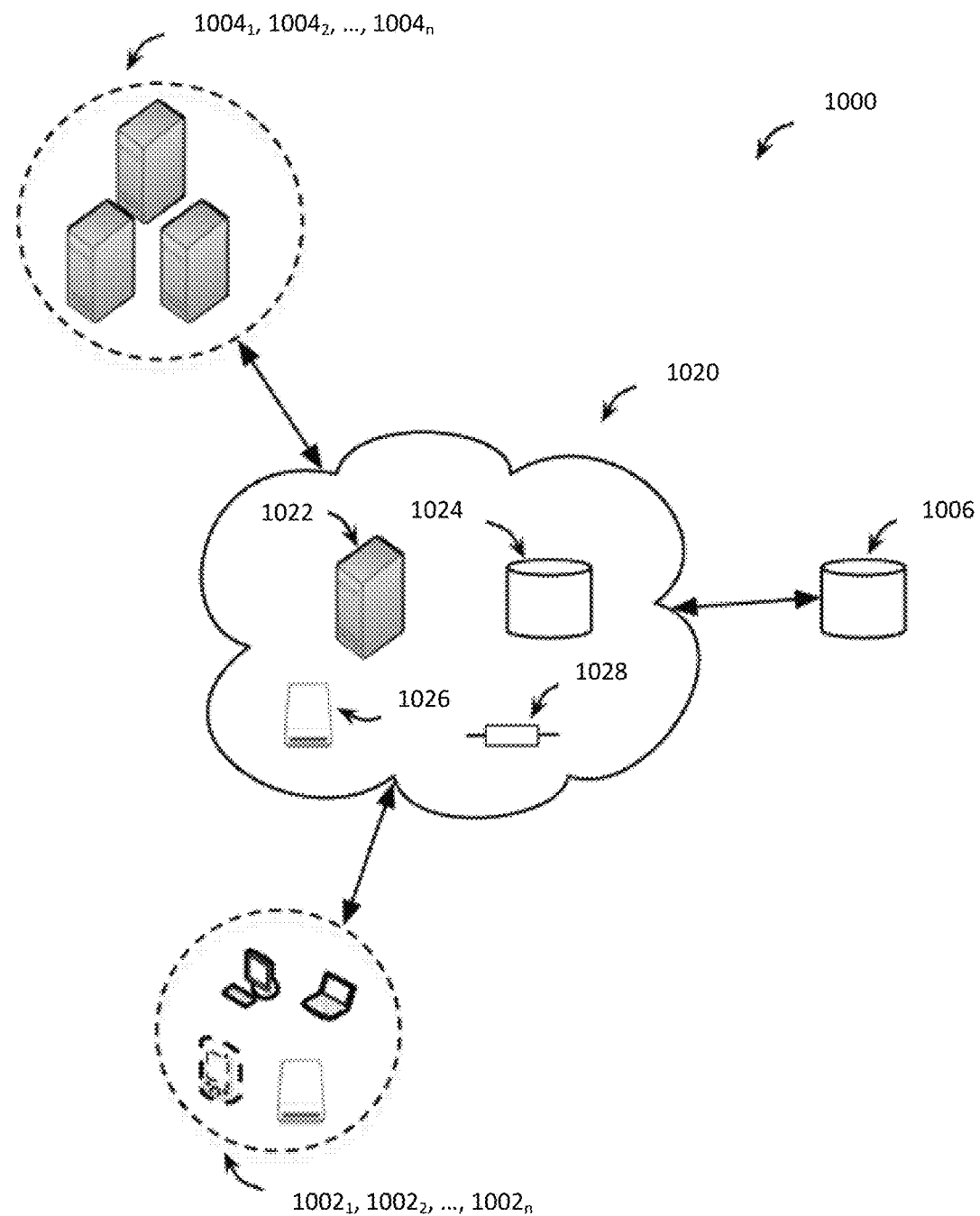
FIG. 10 illustrates an exemplary cloud computing system configuration.

FIG. 9 and FIG. 10 illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 9 illustrates a conventional system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

Cloud computing is a type of Internet-based computing in which a variety of resources are hosted and/or controlled by an entity and made available by the entity to authorized users via the Internet. FIG. 10 illustrates an exemplary cloud computing system configuration 1000 wherein a variety of electronic devices can communicate via a network for purposes of exchanging content and other data. The system can be configured for use on a wide variety of network configurations that facilitate the intercommunication of electronic devices. For example, each of the components of system 1000, in FIG. 10, can be implemented in a localized or distributed fashion in a network.

System 1000 can be configured to include cloud computing resources 1020 (i.e., "the cloud"). The cloud resources can include a variety of hardware and/or software resources, such as cloud servers 1022, cloud databases 1024, cloud storage 1026, cloud networks 1028, cloud applications, cloud platforms, and/or any other cloud-based resources. In some cases, the cloud resources are distributed. For example, cloud storage 1026 can include multiple storage devices. In some cases, cloud resources can be distributed across multiple cloud computing systems and/or individual network enabled computing devices. For example, cloud computing resources 1020 can communicate with servers $1004_1, 1004_2, \ldots, 1004_n$ (collectively "1004"), database 1006, and/or any other network enabled computing device to provide the cloud resources.

Furthermore, in some cases, the cloud resources can be redundant. For example, if cloud computing resources 1020 is configured to provide data backup services, multiple copies of the data can be stored such that the data is still be available to the user even if a storage resource is offline, busy, or otherwise unavailable to process a request. In another example, if cloud computing resources 1020 is configured to provide software, the software can be available from different cloud servers so that the software can be served from any of the different cloud servers. Algorithms can be applied such that the closest server or from the server with the lowest current load is selected to process a given request.

In system 1000, a user interacts with cloud computing resources 1020 through user terminals $1002_1, 1002_2, \ldots, 1002_n$ (collectively "1002") connected to a network by direct and/or indirect communication. Cloud computing resources 1020 can support connections from a variety of different electronic devices, such as servers; desktop computers; mobile computers; handheld communications devices, e.g., mobile phones, smart phones, tablets; set top boxes; network-enabled hard drives; and/or any other network-enabled computing devices. Furthermore, cloud computing resources 1020 can concurrently accept connections from and interact with multiple electronic devices. Interaction with the multiple electronic devices can be prioritized or occur simultaneously.

Cloud computing resources 1020 can provide cloud resources through a variety of deployment models, such as public, private, community, hybrid, and/or any other cloud deployment model. In some cases, cloud computing resources 1020 can support multiple deployment models. For example, cloud computing resources 1020 can provide one set of resources through a public deployment model and another set of resources through a private deployment model.

In some configurations, a user terminal 1002 can access cloud computing resources 1020 from any location where an Internet connection is available. However, in other cases, cloud computing resources 1020 can be configured to restrict access to certain resources such that a resource can only be accessed from certain locations. For example, if cloud computing resources 1020 is configured to provide a resource using a private deployment model, then cloud computing resources 1020 can restrict access to the resource, such as by requiring that a user terminal 1002 access the resource from behind a firewall.

Cloud computing resources 1020 can provide cloud resources to user terminals 1002 through a variety of service models, such as Software as a Service (SaaS), Platforms as a service (PaaS), Infrastructure as a Service (IaaS), and/or any other cloud service models. In some cases, cloud computing resources 1020 can provide multiple service models to a user terminal 1002. For example, cloud computing resources 1020 can provide both SaaS and IaaS to a user terminal 1002. In some cases, cloud computing resources 1020 can provide different service models to different user terminals 1002. For example, cloud computing resources 1020 can provide SaaS to user terminal 1002$_1$ and PaaS to user terminal 1002$_2$.

In some cases, cloud computing resources 1020 can maintain an account database. The account database can store profile information for registered users. The profile information can include resource access rights, such as software the user is permitted to use, maximum storage space, etc. The profile information can also include usage information, such as computing resources consumed, data storage location, security settings, personal configuration settings, etc. In some cases, the account database can reside on a database or server remote to cloud computing resources 1020 such as servers 1004 or database 1006.

Cloud computing resources 1020 can provide a variety of functionality that requires user interaction. Accordingly, a user interface (UI) can be provided for communicating with cloud computing resources 1020 and/or performing tasks associated with the cloud resources. The UI can be accessed via an end user terminal 1002 in communication with cloud computing resources 1020. The UI can be configured to operate in a variety of client modes, including a fat client mode, a thin client mode, or a hybrid client mode, depending on the storage and processing capabilities of cloud computing resources 1020 and/or the user terminal 1002. Therefore, a UI can be implemented as a standalone application operating at the user terminal in some embodiments. In other embodiments, a web browser-based portal can be used to provide the UI. Any other configuration to access cloud computing resources 1020 can also be used in the various embodiments.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer implemented method, comprising:
   receiving a request to terminate playback of a media item on an electronic device, the media item being of a type;
   responsive to receiving the request to terminate playback of the media item, determining a playback position of the media item when the request was received;
   determining, based on comparing the playback position of the media item to a predefined period, that the request to terminate playback of the media item corresponds to an instruction to pause playback of the media item, wherein the predefined period is determined based on the type of the media item;
   responsive to determining that the request to terminate playback corresponds to the instruction to pause, generating a playback record of the media item, the playback record including a media identifier corresponding to the media item and the playback position; and
   storing the playback record using the first electronic device.

2. The computer implemented method of claim 1, further comprising:
   receiving a request to resume the playback of the media item on the electronic device; and
   resuming the playback of the media item based on the media identifier and a bookmark position on the electronic device.

3. The computer implemented method of claim 2, further comprising:
receiving a second request to terminate playback of the media item on the electronic device;
determining that the second request to terminate playback of the media item is a stop instruction, based upon a determination that the playback position of the media item corresponding to the second request to terminate playback of the media item is outside the predefined period, and
resetting the playback position of the media item within the playback record.

4. The computer implemented method of claim 3, wherein the playback position of the media item outside the predefined period corresponds to ending or beginning credits of the media item.

5. The computer implemented method of claim 1, wherein the playback position is within a body of the media item.

6. The computer implemented method of claim 1, wherein determining that the request corresponds to the instruction to pause playback includes determining that the type of the media item is a type approved for resumed playback.

7. The computer implemented method of claim 1, wherein receiving the request to terminate playback of the media item on the electronic device comprises:
receiving input to terminate an application presenting the media item.

8. A computer implemented method of claim 1, further comprising:
storing the media identifier corresponding to the media item with a bookmark position corresponding to the playback position, wherein the media item is associated with a base version number;
receiving a second request to terminate playback of the media item on the electronic device;
responsive to receiving the second request to terminate playback of the media item, determining that the media item is subject to resumed playback, wherein determining that the media item is subject to resumed playback is based, at least in part, on determining that the type of the media item satisfies at least one predetermined criteria;
responsive to determining that the media item is subject to resumed playback, determining a second playback position of the media item when the second request to terminate playback was received;
determining that the second playback position of the media item is outside a predefined portion of the media item, wherein the predefined portion is identified based on metadata corresponding to the media item;
determining that the request to terminate playback of the media item is a stop instruction based upon the determination that the second playback position of the media item is outside of the predefined portion; and
responsive to determining that the second request to terminate playback of the media item is the stop instruction, resetting the bookmark position of the media item.

9. The computer implemented method of claim 8, wherein the second playback position of the media item outside the predefined period corresponds to ending or beginning credits of the media item.

10. A non-transitory computer readable medium storing instructions that, upon being executed by one or more computing systems, cause the one or more computing systems to:
receive a request to terminate playback of a media item on an electronic device, the media item being of a type;
responsive to receipt of the request to terminate playback of the media item, determine a playback position of the media item when the request was received; compare the playback position of the media item to a predefined period, wherein the predefined period is determined based on the type of the media item;
determine that the request to terminate playback of the media item is a pause instruction, based upon the comparison of the playback position of the media item to the predefined period;
responsive to the determination that the request to terminate is the pause instruction, generate a playback record of the media item, the playback record including a media identifier corresponding to the media item and the playback position; and
store the playback record using the electronic device.

11. The non-transitory computer readable medium of claim 10, including further instructions that, upon being executed by the one or more computing systems, cause the one or more computing systems to:
receive a request to resume playback of the media item on the electronic device; and resume playback of the media item based on the media identifier and a bookmark position on the electronic device.

12. The non-transitory computer readable medium of claim 10, including further instructions that, upon being executed by the one or more computing systems, cause the one or more computing systems to:
receive a second request to terminate playback of the media item;
determine that the request to terminate playback of the media item is a stop instruction, based upon a determination the playback position of the media item is within a portion of the media item outside the predefined period, and
reset the playback position of the media item.

13. The non-transitory computer readable medium of claim 12, wherein the portion of the media item outside the predefined period corresponds to ending or beginning credits of the media item.

14. The non-transitory computer readable medium of claim 10, wherein the playback position is within a body portion of the media item.

15. The non-transitory computer readable medium of claim 10, wherein the determination that the request corresponds to the pause instruction includes a determination that the type of the media item is a type approved for resumed playback.

16. The non-transitory computer readable medium of claim 10, wherein the instructions that, upon being executed by the one or more computing systems, cause the one or more computing systems to receive the request to terminate playback of the media item on the electronic device comprise instructions that, upon being executed by the one or more computing systems cause the one or more computing systems to receive input to terminate an application presenting the media item.

17. The computer implemented method of claim 3, further comprising permitting playback of the media item, at the playback position, on the electronic device, the playback position comprising a beginning of the media item.

18. The computer implemented method of claim 8, further comprising permitting playback of the media item, at the second playback position, on the electronic device, the second playback position comprising a beginning of the media item.

19. The non-transitory computer readable medium of claim 10, including further instructions that, upon being executed by the one or more computing systems, cause the one or more computing systems to:
   permit playback of the media item, at the playback position, on the electronic device, the playback position comprising a beginning of the media item.

20. The computer implemented method of claim 1, further comprising:
   comparing a domain version number of a playback record with a base version number; and
   transmitting, based on determining a difference between the domain version number and the base version number, a version conflict notification.

21. The method according to claim 1, wherein determining whether the media item is subject to resumed playback based on the type of the media item further comprises determining whether the media item is of a video type.

22. The method according to claim 1, wherein determining whether the media item is subject to resumed playback based on the type of the media item further comprises determining whether the media item is of an audio type.

23. The computer implemented method of claim 8, wherein determining that the type of the media item satisfies at least one predetermined criteria comprises determining that the media item is a video file.

24. The computer implemented method of claim 8, wherein determining that the type of the media item satisfies at least one predetermined criteria comprises determining that the media item is an audio file.

* * * * *